UNITED STATES PATENT OFFICE 2,379,358

COLORED GRANULATED MATERIAL

Clifford L. Jewett, Minneapolis, Minn., assignor to Minnesota Mining & Manufacturing Company, St. Paul, Minn., a corporation of Delaware No Drawing. Application April 8, 1939, Serial No. 266,861. In Canada January 30, 1936

20 Claims. (Cl. 117—27)

This application is a continuation-in-part of my co-pending application Serial No. 700,632, filed December 1, 1933. It is also a continuation-in-part of my application Serial No. 749,481, filed October 22, 1934 and of my application Serial No. 233,293, filed October 4, 1938.

This invention relates in general to comminuted or granular material, of a mineral, siliceous or like nature, and to coating compositions or colored coatings which are substantially insoluble and/or weather-resistant. It more particularly relates to an improved process for treating such granular material and to the resultant product. My invention especially concerns the production of such a granulated or mineral material, or the like, having a water-resistant, color-bearing coating suitable for embodiment in roofing material or the like, for example, and while the invention is described and illustrated in connection with colored granules, and processes for making the same, to be incorporated in roofing materials such as shingles and the like, to weatherproof and/or beautify the same, it will be understood that this invention finds a wide field of utility which is not restricted by the examples or illustrations employed.

This application is based upon or is a continuation-in-part of my copending application Serial No. 700,632, filed December 1, 1933.

The product of this invention may be incorporated as a coating for a roofing shingle or as an aggregate for incorporation in artificial stone such as cast stone and the like, and for the base granule I may employ substances of a mineral, siliceous or like nature, whether of natural or artificial origin, such, for example, as quartz, quartzite or igneous rock, which are relatively inert, or even slags, feldspar or slate, or, in fact, practically any of the minerals which may be found in the ordinary gravel pit as natural mineral substances, or I may employ crushed brick and other baked clay and similar material, porcelain, terra cotta or other ceramic wastes or cement compositions.

In the prior art relating to this subject, particularly where a ceramic coating is applied to the mineral base granule under the application of high temperatures to produce a glaze thereon, it is necessary to employ care in selecting a base granule which must be refractory and free from impurities which tend to discolor the glaze.

I am enabled to employ a relatively inexpensive base granule, and the ordinary impurities found in mineral materials, such as iron and manganese, have no effect on the resulting color obtained in the coating, and thus practically any gravel pit may yield a granule suitable for coating according to the process of my invention.

The coated granule, according to this invention, may, for example, be incorporated as a weather-resisting or beautifying coating in a sheet coated with a bituminous, asphaltic or other adhesive or binder, e. g. for forming roofing material either in the form of rolls or shingles, or the base granule coated according to this invention may be incorporated in cast stone, concrete, plaster and the like.

Heretofore, efforts have been made to treat crushed mineral material with a color bound to the granule with an organic bond, but this is unsuited for many purposes, inasmuch as the colors are only indifferently permanent, and the organic bond does not have the life or ageing characteristics necessary, particularly where it is desired to employ the granules in exposure to the atmosphere, as in roofing material or in cast stone and the like.

As an alternative, inorganic bonds have been experimented with, and chief among those known to me are the type employing sodium silicate as a dried film on, for example, a calcium-containing base at temperatures of the order of 450° F. or those in which certain combinations of sodium silicate and glaze-forming metal compounds have been employed at relatively high temperatures to produce a fused coating or glaze on the surfaces of the granules or comminuted particles. So far as I know, no one prior to this invention ever recognized the merit and advantages of coatings, especially colored coatings, comprising the reaction product of a clay, such as kaolin with sodium silicate, which coating or product, according to this invention is desirably produced at temperatures substantially above the point of dehydration of the alkali silicate but below the fusion point of the clay and sodium silicate mix (which is also normally below the fusion point of the sodium silicate), temperatures ranging from 850° or 950° F. up to about 1450° F. being illustrative reaction temperatures. Where an alkali metal fluoride, such as cryolite hereinafter mentioned, is present in the clay-sodium silicate mix, a maximum temperature of the order of 1050° F. is usually sufficient; while in the absence of an alkali metal fluoride (as for example where kaolin and sodium silicate are substantially the only reactants), a top temperature of the order of 1350°, 1400° or even 1450° F. is often desirable, so long as the granules are kept below the fusion point of the sodium silicate and/or of the kaolin-sodium silicate mix, in order to produce granules having a coating which is preferably unfused and which is substantially free of water-soluble salts of sodium.

In various of these methods, as distinguished from the present invention, the colors or pigments are distributed or dispersed in a sodium silicate solution, the granules being coated with this mixture and heated sufficiently (e. g. 450° F.) to bind the color and the silicate to the granules. Among the defects of those older methods and the resulting products or articles which limit their possible use are the lack of strength of color or proper tone of color, or tendency to blooming, lack of permanence of color and the limit of the range of colors available.

In the prior art known to me employing silicates, the temperatures disclosed in such prior art are insufficient to produce an insoluble coating composition on the granules, and, furthermore, the relationship between the silicates and other ingredients disclosed in the prior art are insufficient or unsatisfactory to provide a cement which is insoluble and weather-resisting.

The principal objects and advantages of this invention reside in the provision of an improved article of manufacture, coated colored granules, which may be manufactured with a wide range of colors of extreme permanence and at a reasonable cost; the provision of treated granules of the character referred to in which a good bonding action can be attained between the base granule and the color-bearing coating; the provision of an improved granulated material suitable for use when exposed to the weather, in which desired color effects may be attained and in which steps of carrying out the process of manufacturing the same are reduced so as to reduce the cost of manufacture.

This invention also contemplates an improved method of applying a color-bearing coating to mineral, siliceous or like granules or particles, which does not necessarily require, and, in fact, preferably avoids the employment of the extremely high temperatures usually found necessary in producing glassy coatings; the provision of an improved process in which the reaction products of a water-soluble silicate and a material containing a metallic oxide, or a mixture of metal oxides or compounds of aluminum or equivalent, especially a clay, are employed for incorpoartion in a coating to be applied to a mineral or other granule, especially a substantially inert granule; the provision of an improved process and resulting article in which the silicates, such as sodium silicate in aqueous solution, and aluminiferous materials or metallic oxide-containing components such as clays, especially those of the nature of kaolin (plus, if desired, certain amounts of aluminiferous materials, such as aluminium silicate, sodium aluminum silicate, and/or sodium alumino fluoride) may be reacted together with a pigment to form a cement color-bearing coating on the individual granules; the provision of an improved article of manufacture having a color-bearing coating on the individual granules thereof including the heat reacted product of a silicate and a clay; the provision of an improved granulated material having a color-bearing coating wherein the coating is rendered insoluble by the production of a heat reaction product of sodium silicate and clay or of a mixture comprising or consisting substantially of an alkali silicate and a clay such as kaolin, including a pigment; the provision of an improved process for the production of granulated material having the individual granules provided with a weather-resisting and insoluble color-bearing coating wherein an improved step of treating the coating is employed for dehydrating and insolubilizing the coating for its entire depth, but, at the same time, preferably avoiding fusion of the coating mixture and thus avoiding deleterious effects on the coating.

The present invention has, as further objects, the provision of an improved granulated finished material having a colored coating which is permanent in its adherence to the granule; a coating material which has the property of desired fluidity by virtue of the process employed in the course of its application to the granule and which coating material, therefore, readily spreads on the base granule, assisting in attaining the desired permanence of adherence to the granule, and at the same time possesses suitable coefficients of expansion and contraction so that the color coating may be successfully applied on a wide range of different materials forming the base granule or particle to be coated.

For the purpose of my invention, I have employed quartzite granules, due to their relatively inert character and their ready availability, but it will be understood that, by keeping the temperatures within limits hereinafter pointed out, e. g. by use of a rotary kiln of controlled temperatures, these and other granules may be employed for the purpose, such, for example, as common gravel, slate, gannister, etc., as well as crushed porcelain and the like. The base granules may be of any suitable size, an exemplary and contemplated size being such that the granules will pass a "10-mesh" screen but be retained on a "35-mesh" screen, though the coating of both larger and smaller particles is comprehended.

The present invention in one of its forms employs as a coating composition an inorganic heat reaction product of a silicate, preferably sodium silicate, and a clay, such, for example, as kaolin, or, if kaolin is not used, clays of the nature of pyrophyllite, kyanite and/or bentonite, and the like, may be used, and the particular ingredients which I have employed as hereinafter pointed out, when treated according to my process, produce a reaction product or coating composition which is substantially insoluble in water and is weather-resistant even under various changes in weather conditions, it being one of the aims of this invention to produce a coating containing the reaction product of a silicate and a clay, especially a hydroplastic clay, e. g. kaolin, wherein a substantial dehydration of the mixture takes place without, however, fusion thereof, so that a coating having improved utility and appearance will be attained and a wide choice is given in the selection of the base granule and coloring material or pigments. However, it will be understood that coating compositions comprising the reaction product of hydrous plastic clay and alkali silicate are broadly comprehended although the reaction product may be in a sintered state, or even in a fused state although the completely fused material is not as desirable as the unfused coating or the clay-sodium silicate solid phase reaction product.

Thus the preferred coating of my invention may be conveniently termed a high temperature or "heat cementitious reaction product" or cement, and where this expression is employed herein and in the claims, I mean to include materials or combinations of materials which are heat reacted to an extent above dehydration temperature of the alkali silicate but below the temperature at which the combination of materials would completely fuse.

As herein pointed out, the mineral base granule may be of any material which will withstand temperatures of the degree necessary to produce the reaction between the silicate and clay without disintegration of the granule, and a suitable pigment to be employed for imparting color to the coating should also be capable of withstanding the temperature necessary to produce the desired final coating.

The bond in one of its forms in holding the pigment in the coating to the granule is substantially a high temperature reaction product or cement produced by the reaction of sodium silicate and a clay such as kaolin, or in other of its forms may employ with the clay substitute materials such as sodium silicate with feldspar and/or cryolite, instead of sodium silicate alone, or the sodium silicate may be partially replaced with certain alkali compounds of aluminum and used with clay, with or without feldspar or the like, at temperatures which, for my purposes, I have found to range above 450° C. (850° F.) and usually above 1000° F., which temperatures are far above the dehydration point of the sodium silicate. While any suitable means known to those skilled in this art may be employed for attaining such temperatures and effecting the desired reaction and/or coating operation, one of such means which is very satisfactory is a rotary kiln, which may be slowly rotated, e. g. at the rate of 1 to 4 R. P. M. so as to agitate the granules as they are heated. While the granules may spend varying times in their passage through the kiln, illustratively their time of passage may be from several minutes to a couple of hours, ¼ to 1½ hours being illustrative. During their passage through the kiln, the granules may be within the temperature range above 850° F. for less than half the time; for example during one operation where the time of passage is a little less than an hour, the granules were maintained within a temperature range above 850° F. for approximately one-quarter of the total time of passage. In my production of the coating, reaction is produced between the sodium silicate and clay which is substantially a dehydration of both, with a subsequent reaction or sintering together of the two to form a hard, strong and non-porous insoluble and weather-resisting cement or coating containing a coloring compound.

I have found in one of the forms of my invention that the ingredients of the color-bearing coating may be combined in the following proportions:

Granulated mineral (quartzite, etc.) to the extent of 500 grams is moistened with 10 cubic centimeters of a sodium silicate solution. This sodium silicate solution may be of a specific gravity of 1.30, and the sodium silicate may have a ratio of soda to silica as indicated by the formula Na$_2$O–3.25 SiO$_2$; I have obtained excellent results with a sodium silicate of this character.

To this mixture of sodium silicate and mineral I then add five grams of kaolin which is a well known clay and appears to give excellent results in its reaction with the sodium silicate. To this is added four grams of pure red iron oxide, and the mix is then agitated until the granules are completely coated.

The above formula may be presented in table form, as follows:

*Formula 1*

| | Pounds |
|---|---|
| Granules (quartzite, etc.) | 2000 |
| Kaolin | 20 |
| Red iron oxide | 16–28 |
| Sodium silicate solution of 1.3 spec. grav. | 52 |
| Additional water if desired to facilitate mixing. | |

The proportions of sodium silicate to kaolin or equivalent may be either increased or decreased by 25 percent or more and still give a good coating, the above example illustrating good proportions.

By preliminarily wetting or moistening the granules with the aqueous solution of sodium silicate they are made more receptive to the coating composed of the clay and color pigment such as red iron oxide, ultramarine blue or cobalt blue, a green pigment comprising or consisting of chrome oxide, a black pigment comprising carbon black, or the like.

The granules thus coated are then dried and heated to subject them to a temperature of from 850° to 1400° F. (450° to 750° C.) or higher, top temperatures within the range of 1000° to 1450° F. being common. Under the application of heat in controlled amount, such a reaction between the sodium silicate and clay results as to form an insoluble and weather-resisting coating on the individual granules which permanently retains the pigment so that a color-bearing coating is thus produced. In other words, a substantially non-blooming insoluble coating is produced which is substantially free of water-soluble salts of sodium.

I have found that excellent results are obtained at temperatures even above 1400° F., but the maximum temperature employed is preferably kept controlled below the fusing temperature of the mixture, which fusing temperatures in many cases lie in the range from 1600° F. to 2000° F.

Thus, my invention, in one of its aspects, may be said to give its best results and produce a color-bearing coating of best quality by the employment of much higher temperatures for reaction purposes than have heretofore been employed for getting cementitious combinations. For example, it is well known in the prior art to employ temperatures ranging from 900° F., to as high as 1800° F., for the purpose of producing a fused glaze, depending, of course, on the fusing temperatures of the materials employed. It is not, however, known to me in prior art to produce a hard weather-resisting heat solidified cement with temperatures within the range beginning at or above the dehydration temperatures of the ingredients of the mixture, but controlled below the fusing temperature of the particular mixture employed, especially where the coating ingredients comprise a hydroplastic clay or a kaolin-like material and an alkali silicate; nor is it known to me to react hydrous plastic clay and alkali silicate above temperatures of the order of 850° or 950° F., whether below the points at which the ingredients or products thereof will fuse or not, to produce weather-resistant coatings for granules which are substantially free from water-soluble alkali or sodium salts. These are among the novel features of my invention.

It will be understood, therefore, that my invention in its preferred aspect comprises the choice or use of that range of temperatures in which important reactions and combinations take place not, however, by fusion, e. g. temperatures within the range of 850° or 900° F. up to 1400° or 1450° F., the particular temperature or range of temperatures depending upon the fusion point of the clay-silicate mixture and upon other factors such as the presence or absence of other ingredients such as cryolite above mentioned.

Though coating compositions of the general nature indicated by the above formula are preferred, other formulae which have served to produce highly efficient and attractive color bearing coatings, especially where a clay such as kaolin or pyrophyllite is also present in the mix, employ several different forms of ingredients. In each of these formulae, however, it will be seen that I employ an ingredient containing a metallic oxide and an alkali silicate or their equivalent. Such variations are exemplified below:

A formula containing feldspar and sodium silicate is as follows:

*Formula 2*

| | |
|---|---|
| Quartz | grams 500 |
| Feldspar (powdered) | do 10 |
| Red iron oxide | do 7 |
| Sodium silicate solution | cc 10 |
| Water | cc 5 |

Likewise a formula employing cryolite may be as follows:

*Formula 3*

| | |
|---|---|
| Quartz | grams 500 |
| Cryolite (sodium aluminum fluoride) (powdered) | grams 5 |
| Red iron oxide | do 7 |
| Sodium silicate solution | cc 10 |
| Water | cc 5 |

Other formulae, though not as desirable as the above illustrated coating materials for use in the particular coating operation of this invention, include:

*Formula 4*

| | Grams |
|---|---|
| Quartz | 500 |
| Feldspar (powdered) | 10 |
| Iron oxide | 4 |
| Sodium aluminate | 3.6 |

*Formula 5*

| | |
|---|---|
| Quartz | grams 500 |
| Kaolin | do 5 |
| Sodium dichromate (affords color and cement) | grams 7 |
| Water | cc 10 |

From the foregoing formulae it will be observed that the ingredients such as feldspar and clay, e. g. kaolin, each contain proportions of metallic oxides in combinations, while the cryolite is a sodium alumino fluoride which comprises a metallic fluoride instead of metallic oxide. Where feldspar or cryolite are mentioned, it will be understood that a portion (e. g. one-quarter, one-half or more) of the weight so indicated may be composed of kaolin or the like and also, where sodium aluminate or sodium dichromate are mentioned, it will be understood that sodium silicate may be employed in lieu of such ingredients. However, where sodium silicate replaces sodium dichromate, the coloring ingredient or pigment must be separately provided for.

It will also be recognized that the sodium silicate, sodium aluminate and sodium dichromate ingredients specified herein (though sodium silicate has many advantages over the other two in producing red, blue and other particular coatings) may be characterized as of a group of alkali-bearing components and serve to be reacted upon by clay or the metallic oxide-containing ingredients to produce an insoluble coating. It is an important and preferred aspect of this invention to employ a clayey material, such as kaolin, which will react with the alkali silicate, e. g. sodium silicate, to produce a neutral or colorless matrix or bond which can be colored by the addition of any suitable pigment or coloring material (e. g. red iron oxide, ultramarine blue, chrome oxide, etc.) to provide a finished coating material of any desired color.

It will be understood, of course, that, while I have specified a sodium silicate of a certain specific gravity and have also specified one example of the proportions of sodium silicate to kaolin or like clay and pigment, this formula is subject to variation to suit different conditions and the pigment may be changed or varied to attain different tones of coloring desired.

It is to be understood that the temperature range is also subject to variation, as desired, but that care should be taken, in producing the reaction by heat between the clay and sodium silicate, that an actual fusion of the mixture forming the coating, is not produced, as the avoidance of fusion provides an advantageous coating and one which can be economically and conveniently produced and at the same time prevents or retards release of impurities from the base granules (in the event that they contain impurities) and thereby obviates varying or deteriorating the resultant effect on the color tone of the coating produced.

The granules or particles mentioned in the above formulae may be considered to be of such size that they will pass a 10-mesh screen but be retained on a 35-mesh screen. However, smaller or larger granules may be employed, but, for similar results, the amounts of coating ingredients should be varied in accordance with variations in the surface area of each ton or unit weight of granules.

As distinguished from prior art known to me, my invention produces an insoluble and weather-resisting coating which is of an insoluble and weather-resisting character throughout its entire depth, whereas in the prior art known to me there is produced merely a skin effect, and the coatings of the prior art are not possessed of the character of insolubility throughout their entire depth.

In my process it appears that dehydration of the mixtures containing sodium silicate or the like takes place short of actual fusion of said mixtures (in fact sodium silicate will be dehydrated at temperatures far below the fusion point thereof) and at the same time the sodium silicate reacts with the clay (and also with the feldspar and/or cryolite if the latter is present) by combination, to form an insoluble sodium aluminum silicate which is a distinctly chemical reaction as produced according to my invention and not to be found in the prior art known to me.

The product of a metallic oxide-containing component and an alkali-bearing component, for example, kaolin and alkali silicate, e. g. sodium silicate (with or without feldspar, sodium aluminate, etc.) as disclosed by me, may be of variable composition, the insolubility or resistance of such product or coating to weather being a function of this composition.

In some instances where this invention is employed as a coating for granulated slate, it may be desirable to make certain changes in the proportions, inasmuch as slate itself contains some clay, but the amount of clay contained in slate is not sufficient to react with the sodium silicate or sodium aluminate to render the same insoluble for coating individual granules. On the other hand, I have found that the small amount of argillaceous dust present with slate is in no way detrimental to the coating as applied according to my invention.

For use with a slate, trap rock or basalt granule I have successfully employed the ingredients and their proportions as follows:

| | |
|---|---|
| Slate grams | 500 |
| Kaolin do | 5 |
| Red iron oxide do | 4 |
| Sodium silicate solution sp. g. 1.3 cc | 10 |

The above formula is similar to Formula 1 above except for the base granule here specifically illustrated.

It will be understood that in the case of slate the formula last mentioned above may be varied as desired, depending upon the porosity of the slate.

Other materials, e. g. cement compositions, are suitable for my purposes and may serve as base granules provided such compositions are of a character which will withstand the temperatures necessary for roasting or firing, e. g. temperatures of 850° or 900° to 1450° F., the top temperature employed ordinarily being at least 1000° or 1050° F. where cryolite or other like alkali fluoride, or equivalent, is present with the kaolin-sodium silicate mix and usually being 1350°, or 1400° or even 1450° F. or so in the absence of an alkali fluoride or equivalent in the clay-alkali silicate mix, such top temperature however preferably being below the fusion point of the kaolin-sodium silicate mix and preferably also below the fusion point of the sodium silicate itself. I have found that alkaline earth carbonates do not, by themselves, render sodium silicate sufficiently insoluble to be used as a coating on granules or the like. In producing coated granules, as herein illustrated, where quartzite or various other materials may serve as the base granule, I have found kaolin or similar clay to be a particularly advantageous ingredient of my coating composition in order to arrive at a permanent and insoluble color-bearing coating, which latter comprises a neutral matrix having disseminated therein a coloring material or pigment of the color desired.

From the foregoing it will be observed that my coated granules may be produced by the steps of:

(1) Wetting the quartz granules with an aqueous solution of an alkali-bearing material such as sodium silicate, or perhaps, with a solution of sodium aluminate or sodium dichromate;

(2) Adding a metallic oxide-bearing component, such as clay or its equivalent and a pigment in desired proportions thereto; and (3) Then applying heat at least above the dehydration temperature of the coating mixture, usually above 850° F., and normally above 950° or 1000° F. with a top temperature in excess of 1250° F. being common, but regulating the degree of heat below the fusing point of the coating mixture, preferably below about 1450° F., so as to produce a reaction between the sodium silicate and clay to produce an insoluble, weather-resistant reaction product thereof which may be considered as substantially a sodium aluminum silicate. By this reaction the entire coating of each granule throughout the depth of the coating is rendered waterproof, insoluble and weather-resisting.

In the case of the employment of sodium dichromate as the alkali-containing component, it may be desirable to go to higher temperature limits to produce the required reaction and render the same insoluble, and, in this connection, temperatures high enough to effect at least partial fusion, and also temperatures sufficient to effect substantially complete fusion, are contemplated. However, it will be understood that the preferred practice of this invention involves reacting an alkali silicate (which is usually sodium silicate) with a material preferably of the nature of kaolin (or other clay, e. g. of the pyrophyllite or kyanite type) at temperatures within the range of 900° or 1050° to 1450° F.

While the present invention has herein been specifically illustrated and examples of specific proportions of ingredients, temperature conditions, etc., have been given, it will be understood that such illustrations and examples are only exemplary and not limitative, and that all modifications and variations within the scope of this appliaction and/or within the scope of the appended claims are comprehended.

What I claim is:

1. As a new article of manufacture, roofing granules of the class described having on the exterior thereof a substantially non-blooming insoluble coating, said coating consisting substantially of the heat reaction product of hydrous plastic clay and sodium silicate, said product of reaction being produced at temperatures below the melting point of the clay and sodium silicate mix and above the dehydration point of said sodium silicate, said coating being substantially free of water-soluble salts of sodium.

2. As a new article of manufacture, roofing granules of the class described having on the exterior thereof a substantially non-blooming insoluble coating, said coating consisting predominantly of a reaction product of hydrous plastic clay and alkali silicate produced at a temperature above the dehydration point of said alkali silicate but below the fusion point both of the said alkali silicate and of the clay and sodium silicate reaction product and said reaction product being substantially free of water-soluble alkali salts.

3. As a new article of manufacture, roofing granules of the class described having on the exterior thereof a substantially non-blooming coating, said coating consisting substantially of the reaction product of hydrous plastic clay and sodium silicate and being substantially free from water-soluble salts of sodium.

4. As a new article of manufacture, roofing granules of the class described having on the exterior thereof a substantially non-blooming insoluble colored coating, said coating consisting substantially of pigment and the reaction product of hydrous plastic clay and sodium silicate, and being substantially free from water-soluble salts of sodium.

5. A new article of manufacture, granulated material having a weather resisting color bearing coating on the individual granules thereof, the primary component of which comprises the reaction product of "heat cementation" of a soluble alkali bearing silicate and a clay containing a pigment.

6. A colored coated granulated material including a mineral base granule, having a weather resisting coating thereon consisting of "heat cementitious" reaction product of sodium silicate and clay containing a pigment wherein the product has been dehydrated to an extent short of fusing.

7. A colored coated granulated material comprising a mineral base granule, a weather resisting color bearing coating thereon comprising sodium silicate and kaolin containing a pigment and wherein the sodium silicate and clay are reacted by heat short of actual fusing of the two but to a temperature to produce "heat cementation."

8. As a new article of manufacture a substantially non-reactive granule having on the exterior thereof a substantially non-blooming insoluble coating, said coating comprising the heat reaction product of hydrous plastic clay and sodium silicate, said reaction product being produced within a temperature range above 900° F., said coating being substantially free of water-soluble salts of sodium.

9. In a surfacing material, a bituminous coated backing and a layer of granules thereon, said granules being individually coated on the exterior thereof with a substantially non-blooming coating, said coating comprising the reaction product of hydrous plastic clay and sodium silicate and being substantially free from water-soluble salts of sodium.

10. As a new article of manufacture, weather-resisting granules of the character described having on the exterior of refractory, quartz-bearing base granules a substantially non-blooming insoluble red colored coating comprising a red iron oxide pigment disseminated in the heat reaction product of kaolin and sodium silicate produced at temperatures within the range of 950° and 1450° F. and not higher than substantially the melting point of the said sodium silicate, a maximum reaction temperature of at least 1250° F. being employed, said coating being substantially free of water-soluble salts of sodium.

11. As a new article of manufacture, weather-resisting granules of the character described having on the exterior thereof a substantially non-blooming insoluble blue colored coating comprising ultramarine blue pigment disseminated in the product of reaction of kaolin and sodium silicate produced at temperatures within the range of 1000° to 1250° F., said coating being substantially free of water-soluble salts of sodium.

12. A building material or roofing sheet comprising a fibrous backing and a bituminous adhesive material having a weather-resistant coating of colored granules of the character defined in claim 10.

13. A building or roofing sheet material comprising a fibrous backing and a bituminous adhesive material having a weather-resistant coating of colored granules of the character defined in claim 11.

14. The method of coloring granules of the class described, which consists in applying to the same coatings of a hydrous plastic clay and sodium silicate, one of said coatings having therein a coloring pigment and finally heating said granules to a temperature sufficiently high to react said coatings in situ inter se and produce on said particles an insoluble colored coating.

15. The method of coating granules of the class described, which consists in coating the same with a hydrous plastic clay and a coating including sodium silicate, and finally heating said granules to a temperature sufficiently high to react said coatings in situ inter se and produce on said particles an insoluble exterior coating, the major portion of which coating last mentioned consists of the reaction product of said clay and said silicate.

16. The method of producing color bearing coatings on granulated material which includes producing a cementitious reaction product primarily from an alkali silicate and a clay containing a pigment on the surface of a base granule by the application of heat short of actual fusing of the product.

17. The method of producing coatings on granulated material which includes reacting an alkali silicate and a clay by heat on the surface of a heat resistant base granule to produce an insoluble weather resisting coating thereon and controlling the heat treatment within limits above substantially that to attain a dehydration of the coating but short of fusion thereof.

18. The method of producing coatings on granulated material which includes reacting an alkali silicate and a clay by heat in excess of 850° F. on the surface of a heat resistant base granule to produce in situ an insoluble weather resisting "heat cementitious" coating thereon.

19. The method of producing colored coatings on granulated material which includes the employment of a base granule having heat resistant qualities, moistening the surface of the granule with a sodium silicate solution, then subjecting the thus coated granule to agitation in the presence of a mixture of a clay and pigment, and then heating to cause "heat cementation."

20. In a roofing sheet, a surface coated with granulated material having a coating as set forth in the last preceding claim.

CLIFFORD L. JEWETT.